United States Patent
Rumyankov et al.

(10) Patent No.: US 10,567,180 B2
(45) Date of Patent: Feb. 18, 2020

(54) METHOD FOR MULTICAST PACKET TRANSMISSION IN SOFTWARE DEFINED NETWORKS

(71) Applicant: OBSCHESTVO S OGRANICHENNOI OTVETSTVENNOSTYU «PROGRAMMIRUEMYE SETI», Moscow (RU)

(72) Inventors: Alexandr Sergeevich Rumyankov, Nizhny Novgorod (RU); Maksim Valerievich Kaminsky, Moscow (RU); Sergey Ilich Romanov, Moscow (RU)

(73) Assignee: OBSCHESTVO S OGRANICHENNOI OTVETSTVENNOSTYU «PROGRAMMIRUEMYE SETI», Moscow (RU)

( * ) Notice: Subject to any disclaimer, the term of this patent is extended or adjusted under 35 U.S.C. 154(b) by 0 days.

(21) Appl. No.: 15/977,199

(22) Filed: May 11, 2018

(65) Prior Publication Data

US 2018/0262355 A1 Sep. 13, 2018

Related U.S. Application Data

(63) Continuation of application No. PCT/RU2016/050033, filed on Sep. 12, 2016.

(30) Foreign Application Priority Data

Nov. 13, 2015 (RU) .............................. 2015139530

(51) Int. Cl.
*H04L 12/18* (2006.01)
*H04L 12/761* (2013.01)
(Continued)

(52) U.S. Cl.
CPC .............. *H04L 12/18* (2013.01); *H04L 45/12* (2013.01); *H04L 45/16* (2013.01); *H04L 45/24* (2013.01); *H04L 49/15* (2013.01); *H04L 49/30* (2013.01)

(58) Field of Classification Search
CPC ..... H04L 12/18; H04L 49/201; H04L 12/185; H04L 49/30; H04L 45/16; H04L 49/15; H04L 45/12; H04L 45/24
See application file for complete search history.

(56) References Cited

U.S. PATENT DOCUMENTS

2013/0322443 A1 12/2013 Dunbar et al.
2014/0241356 A1 8/2014 Zhang et al.
(Continued)

FOREIGN PATENT DOCUMENTS

WO 2015127888 A1 9/2015

OTHER PUBLICATIONS

International Search Report with regard to PCT/RU2016/050033 dated Dec. 29, 2016.

*Primary Examiner* — Thai Nguyen
(74) *Attorney, Agent, or Firm* — BCF LLP

(57) ABSTRACT

A method for multicast packet transmission, executable in a software defined network having at least one input port, at least two output ports, and at least one network node. Switching rules are generated for transmitting at least one packet of a multicast group from an input port to an output port. For a given external traffic consumer, which is the first to request the multicast group, a shortest path from a given input port to a given output port, associated with the given external traffic consumer, is determined. For a subsequent external traffic consumer requesting the at least one multicast group, a shortest path from a network node closest to an output port of the subsequent external traffic consumer,
(Continued)

where the switching rules for the multicast group are set, is determined.

8 Claims, 4 Drawing Sheets

(51) Int. Cl.
*H04L 12/935* (2013.01)
*H04L 12/721* (2013.01)
*H04L 12/933* (2013.01)
*H04L 12/707* (2013.01)

(56) References Cited

U.S. PATENT DOCUMENTS

| | | | |
|---|---|---|---|
| 2015/0124815 A1* | 5/2015 | Beliveau | H04L 45/38 370/392 |
| 2015/0163152 A1 | 6/2015 | Li | |
| 2016/0366070 A1* | 12/2016 | Yeung | H04L 49/201 |
| 2017/0251515 A1* | 8/2017 | Altman | H04L 43/08 |

* cited by examiner

METHOD FOR MULTICAST PACKET TRANSMISSION IN SOFTWARE DEFINED NETWORKS

CROSS-REFERENCE

The present application is a continuation of International Patent Application no. PCT/RU2016/050033, filed on Sep. 12, 2016, entitled "METHOD FOR GROUPED TRANSMISSION OF PACKETS OVER SOFTWARE-DEFINED NETWORKS". This application is incorporated by reference herein in its entirety.

TECHNICAL FIELD

This document relates in general to methods for data multicasting, and in particular to methods for transmitting information in packet-switched software-defined networks (SDN), consisting of switches with Ethernet ports and controlled by software controllers.

BACKGROUND

Currently, SDN networks provide multicast packet switching mainly by converting packets into multicast broadcast frames and propagating them to all available administrative network ports. This leads to excessive replication of traffic and imposes limitations on the ability of a network to scale when there is a large number of users.

In software-defined networks, network management and data transfer layers are separated by delegating management functions (performed by routers, switches, etc.) to applications running on a separate server (controller). The idea of such networks was suggested by specialists of Stanford and Berkeley Universities in 2006, and the studies initiated by them found support not only among academicians, but were also embraced by the leading manufacturers of network equipment, who in March 2011, founded the Open Networking Foundation (ONF) consortium. Its founders were Google, Deutsche Telekom, Facebook, Microsoft, Verizon and Yahoo.

IT companies are interested in SDN because such technologies can give a 25-30% improvement of network equipment performance, a 30% reduction of network operating costs, streamline network management, ensure better security and provide users with the ability to programmatically create new services and quickly upload them to the network's hardware.

Patent document US20130322443A1 "SDN Facilitated Multicast in Data Center" (patentee: Futurewei Technologies, Inc., published on May 12, 2013) describes a method that requires a dedicated multicast controller, with this controller is used to transport traffic to virtual machines and designed for use in data centers only, which are significant drawbacks.

Currently, in SDN networks, packet multicasting using IPv4 protocol is mostly carried out by converting them into broadcast frames and propagating them to all available administrative network ports. This leads to excessive replication of traffic and imposes limitations on the ability of a network to scale when there is a large number of users.

SUMMARY

Present technical solution is aimed at eliminating the drawbacks inherent in the existing solutions known from the prior art. The present technical solution may permit to increase efficient usage of network resources by arranging the best path for multicasting packets of some group address to the requesting subscriber from the nearest source without using an internal group routing protocol.

Some of the non-limiting embodiments of the present technical solution may eliminate the need for a packet broadcast, directing the traffic only to the output ports, where a request for the multicast group is received from, via the traffic distribution tree made up of the shortest paths.

This permits to reduce network channels and output ports load, direct the traffic along the shortest path, eliminate the need for traffic loop prevention protocols.

In one aspect, a method for multicast packet transmission is provided. The method is executable in a software defined network.

In at least one embodiment, the software defined network has at least one input port configured to receive packets from at least one external traffic source; at least two output ports configured to receive requests from at least one external traffic consumer; and at least one network node configured to generate switching rules.

In at least one embodiment, the method comprises: receiving, via the at least two output ports, a request to receive packets from at least one multicast group from at least one external traffic consumer; receiving, via the at least one input port, at least one packet of the at least one multicast group from an external traffic source; generating, by the at least one network node, switching rules for transmitting packets of the at least one group.

In at least one embodiment, the generating of the switching rules is executed such that: for a given one of the at least one external traffic consumer, the given one of the at least one external traffic consumer being the first to request the at least one multicast group, determining a shortest path from (i) a given one of the at least one input port associated with the given one of the at least one external traffic consumer to (ii) a given one of the at least one output port associated with the given one of the at least one external traffic consumer; for a subsequent external traffic consumer, requesting the at least one multicast group, determining the shortest path from a network node closest to the at least one output port of the subsequent external traffic consumer where the switching rules for the at least one multicast group are set; and causing the at least one packet of the at least one multicast group to be transmitted from the at least one input port to the at least one output port according to the switching rules.

Described herein is a method for multicasting packets through software defined networks in which at least one input port is configured to receive packets from at least one external traffic source and at least two output ports are configured to receive requests from at least one external traffic consumer, then a request is received at at least two output ports to receive packets of at least one multicast group from at least one external traffic consumer, then at least one input port receives at least one packet of the above multicast group from an external traffic source, then switching rules are generated at the network nodes for transmitting packets of at least one group specified in the previous step, and for the external traffic consumer, who is the first to request the multicast group, the shortest path is found from the source input port to the output port connected to this external traffic consumer, and for the subsequent external traffic consumers requesting the multicast group the shortest path is found from a network node closest to the output port of this external traffic consumer where the switching rules for the given group are set and eventually all the packets of at least one multicast group requested in the previous step by at least one external traffic consumer, are transmitted from at least one input port to at least one output port according to the rules of packet switching set in the previous step.

In some embodiments, the availability of traffic sources and the range of groups is controlled by the software defined network controller through periodic short-term monitoring of incoming packets.

In some embodiments, when setting the input port, the ranges of the multicast addresses generated by the external source and received by the input port of the network are set.

In some embodiments, requests for receiving multicast group packets are sent asynchronously.

In some embodiments, multicast group packets from an external traffic source are received at the input port asynchronously.

In some embodiments, when sending packets from an input port, the multicast communications protocol uses a finite state machine algorithm.

In some embodiments, the method may further comprise configuring a given one of the at least one input port, by generating a range of group addresses, the group addresses generated by the at least one external source and received by the at least one input port.

In some embodiments, the request to receive packets from at least one multicast group from the at least one external traffic consumer may be sent asynchronously.

In some embodiments, the at least one packet of the at least one multicast group from the external traffic source may be received, at the at least one input port, asynchronously.

In some embodiments, the method further comprises, during causing the at least one packet of the at least one multicast group to be transmitted, applying a multicast communications protocol's finite state machine algorithm.

In some embodiments, the shortest path is formed by applying Dijkstra's or Bellman-Ford algorithm or an A* search algorithm.

In some embodiments, in determining the shortest path, an initial, terminal, and intermediate network switches are defined along the frame switching path.

In some embodiments, in each switch, included in the shortest path, one input port is configured to receive the traffic from the source side and one output group port, consisting of one or more physical ports, is configured to allow traffic replication from an input port into each physical port being part of the output group port.

In some embodiments, determining the shortest path further comprises defining at least one switch of the shortest path; and for each one of the at least one switch: one input port is configured to receive traffic from the source side and one output group port, consisting of one or more physical ports, is configured to allow traffic replication from the input port to each physical port being part of the output group port.

BRIEF DESCRIPTION OF THE DRAWINGS

The features and advantages of the present technology will become apparent from the following detailed description of the solution and the accompanying drawings wherein.

DETAILED DESCRIPTION

Figure 1:
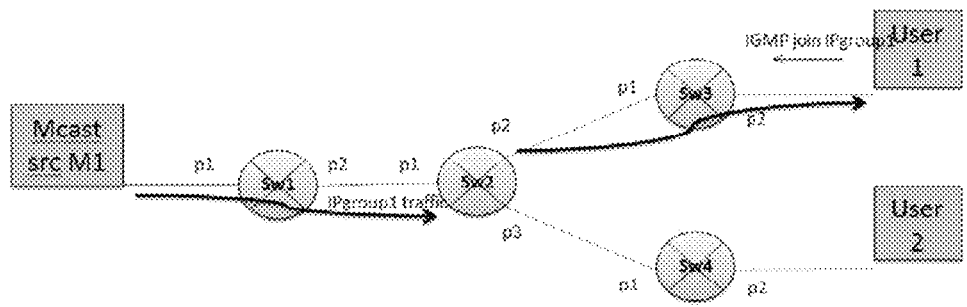
FIG. 1 depicts a result of processing the input IGMP join request to the multicast address, in accordance with non-limiting embodiments of the present technology.

The following concepts and definitions are used in this document.

Software defined network (SDN), as referred to herein, is a data communication network, in which the level of network management is separated from data transmission devices and is implemented as software, which is a form of virtualization of computing resources.

Controller of a software defined network (SDN controller), as referred to herein, is the central control element of a software defined network which defines all the traffic switching rules in all nodes of this network. It is usually implemented as a network application.

Broadcast/broadcasting, as used herein, refers to: one sender, multiple recipients—all devices in the broadcast segment. (Example: ARP request).

Multicast/Multicasting, as used herein, refers to: one sender, multiple recipients (Example: IPTV).

IPv4, as referred to herein, is the fourth version of the IP protocol described in IETF RFC 791.

IPv4 multicast, as referred to herein, is a multicast communication using IPv4.

Ethernet, as referred to herein, is a family of standards that define wiring and electrical signals at the physical level, frame format and medium access control protocols at the OSI data link layer.

Frame, as referred to herein, is the protocol data unit at the OSI data link layer transmitted over the communication link.

Switch, as referred to herein, is a device designed for connecting several nodes of a computer network within one or more network segments at the data link (second) layer of the OSI model.

IGMP (Internet Group Management Protocol), as referred to herein, is a multicast communications control protocol used in IP networks. IGMP is used by routers and IP nodes to organize network devices in groups.

IGMP Membership Report Message (IGMP join), as referred to herein, is a packet, whereby the node "reports" that it wants to receive the traffic of this group.

IGMP Leave Group Message (IGMP Leave), as referred to herein, is a packet, whereby the node "reports" that it does not want to receive the traffic of this group.

Switch, in this technical solution, is a network device equipped with several ports, each of which has an input and output buffer. Switch ports are connected to ports of other switches by physical communication channels (data channels). Packages circulate through these channels. Each switch port has a unique number that acts as a port name. Moreover, one of the switch ports is connected to the controller by a control channel. Via this channel, the switch forwards the packets and statistics to the controller and receives messages from the controller.

Packets, as referred to herein, are elementary data structures that autonomously circulate in the network under the control of switching and forwarding operations. Each packet consists of the header and the payload. When performing switching and forwarding operations, as well as when processing a message with an embedded packet, the payload of the packet is not taken into account and is not changed. Each packet header consists of several fields. These fields indicate physical and virtual addresses of the network subscribers (usually addresses of the packet sender and recipient), information about the network protocol that the packet must be processed with, etc. When a packet is forwarded, its header is not changed.

The most important concept in the field of multicast data transmission is the Source Tree—a traffic distribution tree, which is constructed by the method of the shortest path, and the result of formation of such a tree is the shortest path through which the multicast traffic is transferred from an external data source to an external subscriber. In such trees, the traffic source is like a root with multiple branches, and external network subscribers are represented as its crown.

FIG. 1 shows a result of processing of the input IGMP join request to the multicast IPgroup1 address, in accordance with non-limiting embodiments of the present technology. Sw3 switch forwards an incoming packet with a request to the central controller, which, having full information about the network topology, calculates the shortest path from SW1 input port to SW3 output port using the Dijkstra's algorithm and generates switching rules for the switches SW1, SW2, SW3 by rules that allow switching traffic with IP address IPgroup1 from port Sw1, p1 to Sw3, p2.

To do this, in some embodiments of the present technology, the following forwarding rules can be prescribed:
  input port SW1: IF ("input port"=p1 AND "source IP address"=M1 AND "destination IP address"=IPgroup1) THEN "Forward to the group port containing p2";
  intermediate switch SW2: IF ("input port"=p1 AND "source IP address"=M1 AND "destination IP address"=IPgroup1) THEN "Forward to the group port containing p2"
  output port SW3: IF ("input port"=p1 AND "source IP address"=M1 AND "destination IP address"=IPgroup1) THEN "Forward to the group port containing p2".

Figure 2:
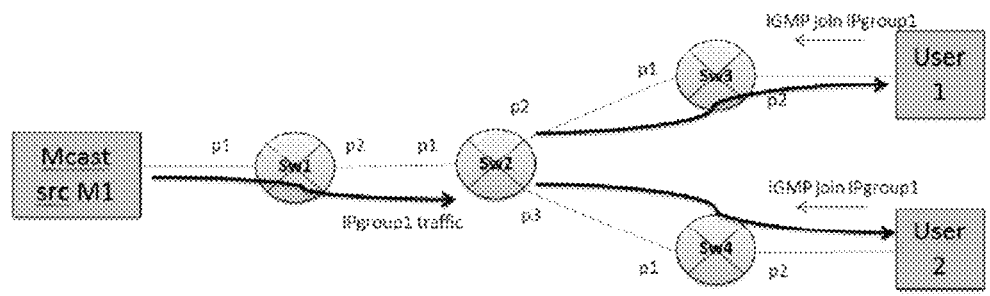
FIG. 2 depicts a result of processing the input IGMP join request of the second subscriber to the same multicast address, in accordance with non-limiting embodiments of the present technology.

FIG. 2 shows a result of processing of the input IGMP join request of the second subscriber (external traffic consumer) to the same IPgroup1 multicast address, in accordance with non-limiting embodiments of the present technology. Switch Sw4 forwards an incoming packet with a request to the central controller, which, having full information about the current state of traffic distribution tree of the group IPgroup1 from an external source M1, makes up a list of all switches, in which the group IPgroup1 is present. Then using the Dijkstra's algorithm the controller, having complete information about the network topology, finds in this list the switch with the shortest path to the switch and the output port SW4 (in this case it is SW2). Then the controller generates switching rules for switches SW2, SW4 by rules that allow switching traffic with IP address IPgroup1 from the port of the intermediate port Sw2, p3 to the output port Sw4, p2.

To do this, in some embodiments of the present technology, the following forwarding rules can be prescribed:
  intermediate switch SW2: modification of the existing rule: IF ("input port"=p1 AND "external source IP address"=M1 AND "destination IP address"=IPgroup1) THEN "Forward to the group port containing p2 and p3";
  output port SW4: IF ("input port"=p1 AND "external source IP address"=M1 AND "destination IP address"=IPgroup1) THEN "Forward to the group port containing p2".

Figure 3:
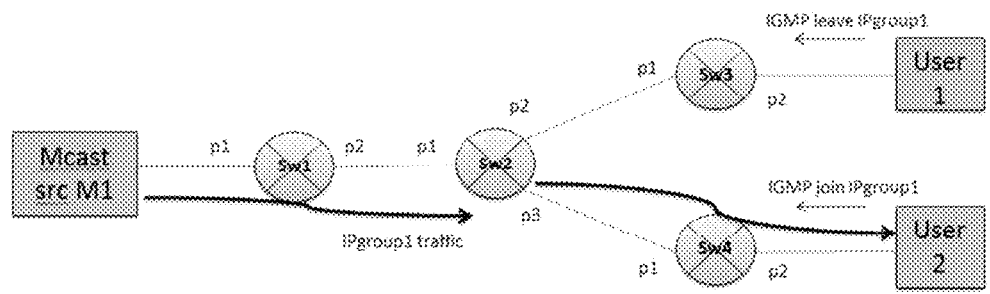
FIG. 3 depicts a result of processing the input IGMP leave request from the first subscriber to the multicast address, in accordance with non-limiting embodiments of the present technology.

FIG. 3 shows a result of processing the input IGMP leave request from the first subscriber to the IPgroup 1 multicast address, in accordance with non-limiting embodiments of the present technology. Sw3 switch forwards an incoming packet with a request to the central controller which may perform the following steps:
  removes port 2 from the group output port IPgroup1;
  checks the remaining port list for IPgroup 1 group output port;
  since the list is empty, the rule for IPgroup1 at the Sw3 output port is completely removed with the value of the input port p1 having been previously saved;
  since p1 is connected to the intermediate port Sw2 p2, then port 2 is removed from the group output port IPgroup1 in Sw2;
  checks the remaining port list for IPgroup1 group output port;
  since the list contains another p3, the process is terminated.

Figure 4:
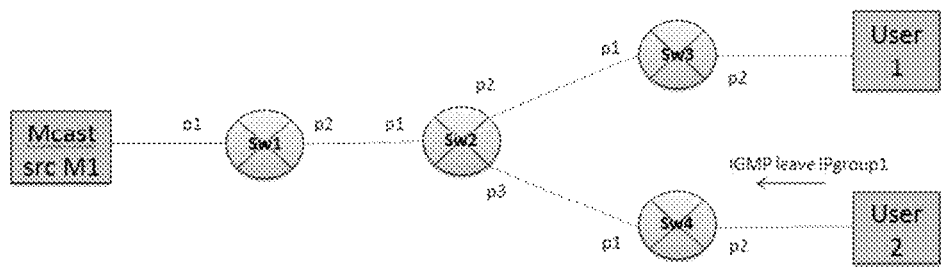
FIG. 4 depicts a result of processing the input IGMP leave request from the second subscriber to the multicast address, in accordance with non-limiting embodiments of the present technology.

FIG. 4 depicts a result of processing of the input IGMP leave request from the second subscriber to the multicast address IPgroup1, in accordance with non-limiting embodiments of the present technology. The switch and output port Sw4 forwards the incoming packet with a request to the central controller that performs a sequence of checks of the group output port IPgroup1 and removals of the tree distribution rules sequentially on Sw4, Sw2, Sw1. As a result, the distribution tree of IPgroup1 group degenerates into the root port M1, i.e. the traffic of the group entering Sw1 p1 is immediately reset.

Figure 5:
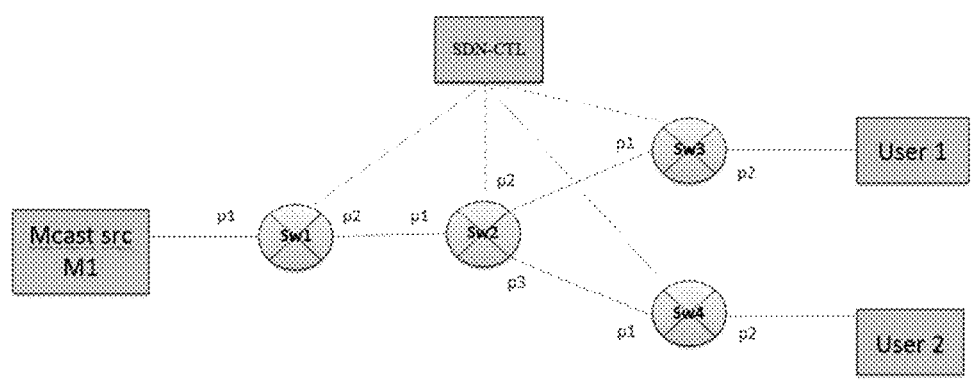
FIG. 5 depicts an example of a SDN-network implementation, in accordance with non-limiting embodiments of the present technology.

FIG. 5 depicts an example of a SDN-network implementation, in accordance with non-limiting embodiments of the present technology.

Figure 6:
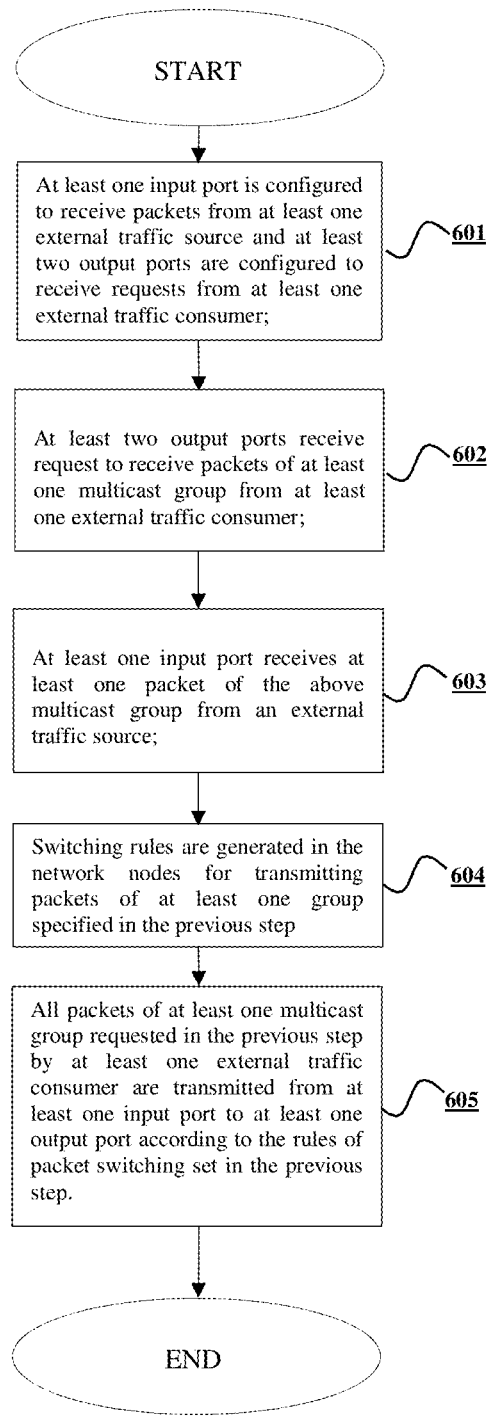
FIG. 6 depicts a method of multicasting packets through a software-defined network, in accordance with non-limiting embodiments of the present technology.

FIG. 6 depicts a method for multicast packet transmission, in accordance with non-limiting embodiments of the present technology. The method may be executed in a software defined network. In at least one embodiment, the method includes the following steps.

At step 601 (FIG. 6), at least one input port is configured to receive packets from at least one external traffic source and at least two output ports are configured to receive requests from at least one external traffic consumer. The input port is used to connect the multicast source that generates IP traffic flows to the configured ranges of multicast addresses. When simulating network traffic distribution, the input port is the root of the traffic distribution Source Tree of each multicast address generated by the source. The controller periodically checks the information about flows being received by listening to the input port or by gathering packet statistics from IP addresses of the recipients (packet transfer rate for each multicast address). The test period is set depending on the required speed of switching to the backup source when the source to be tested fails. Additionally, the network service area (the list of switches and their input ports) can be set during configuration. Furthermore, configuration specifies the output ports from which requests to receive flows from the input ports are allowed.

At step 602 (FIG. 6), a request at at least two output ports is accepted to receive packets from at least one multicast group from at least one external traffic consumer. When the first request (an external consumer sends an IGMP join packet) from one output port (node, which requests traffic) is received at any input (subscriber) port, the SDN controller determines the nearest port from the list of permitted multicast sources, considering possible administrative restrictions on the allowed network area (specified administrative list of output ports) or request attributes (for example, using the IGMPv3 protocol, which allows the subscriber to specify the requested source). The IGMP protocol role is as follows: if there are no subscribers, there is no need to transfer multicast traffic to the segment. When a request from an external traffic consumer is received, the controller notifies the routers by the IGMP protocol that the external consumer wants to receive the traffic. Administrative restrictions may disable a set of output ports to receive traffic from certain sources. The request attributes considered at this stage are the requested multicast address, the requested traffic source (for IGMPv3 protocol requests).

At step 603 (FIG. 6), at least one packet of the above multicast group is received at at least one input port from an external traffic source. The packets come from an external traffic source M1 (FIG. 5) to the input port SW1 (FIG. 5) receiving them. The SDN controller organizes processing of IGMPv2/IGMPv3 messages at the output ports according to the IETF RFC2236/RFC3376 specification using the finite state machine algorithm of these protocols. In simulating traffic distribution at the software level, the output (subscriber) port is a terminal (connected to the external subscriber) branch of the multicast traffic distribution tree.

At step 604 (FIG. 6), switching rules are generated in the network nodes for transmitting packets of at least one group specified in the previous step. The SDN controller may set the traffic switching rules at the initial, terminal and intermediate domain switches along the packet traffic path using multicast IP address as the address information. Further, a group port, which includes one or more physical ports, may be configured as the output port in each switch.

For the external traffic consumer, the first to request a multicast group, the shortest path is found from the source input port to the output port connected to this external traffic consumer.

In this case, referring to FIG. 1, the switching rules may be generated in the following way. For the input port: when the input port is p1, the source IP address is M1, and the destination IP address is IPgroup1, then packets are forwarded to the multicast port containing p2.

For the intermediate port, the rules may be as follows (a person skilled in this field would understand that there may be an unlimited number of intermediate ports): when the input port is p1, the source IP address is M1, and the destination IP address is IPgroup1, then packets are forwarded to the group port containing p2.

Then for the output port: when the input port is p1, the source IP address is M1, and the destination IP address is IPgroup1, then packets are forwarded to the multicast port containing p2.

For the subsequent external traffic consumers requesting the multicast group, the shortest path is found from a network node closest to the output port of this external traffic consumer where the switching rules for the given group are set.

Referring to FIG. 2, the switching rules may be as follows: in this case, there is a modification of the existing rule for the intermediate switch, which is the closest to the output port of the given traffic consumer: when the input port is p1, the external source IP address is M1, and the destination IP address is IPgroup1, then packets are forwarded to the group port containing p2 and p3.

The switching rules for the output port may be as follows: when the input port is p1, the source IP address is M1, and the destination IP address is IPgroup1, then the packets are forwarded to the group port containing p2.

The SDN controller may calculate the shortest path using, for instance (but without limitation), Dijkstra's algorithm (shortest path) to each multicast node and may establish rules for switching traffic in the initial, terminal and intermediate domain switches along the frame transmitting path using the IP address of the multicast group as the address information. Further, a group port, which may include one or more physical ports, may be configured as the output port in each switch.

When, from the source found, a distribution tree of the sought-for group is already built, then all the nodes of this tree may be included in the search for the nearest port of the group source. The SDN controller determines the nearest switch that has an output group port for this multicast group. Then the SDN controller may split the flow of this multicast group by inserting a new physical port into the list of group output port, calculate the shortest path to the subscriber port, and may establish traffic switching rules in the intermediate domain switches along the packet switching path.

At step 605 (FIG. 6), all the packets of at least one multicast group requested in the previous step by at least one external traffic consumer, are transmitted from at least one input port, to at least one output port according to the switching rules set in the previous step.

This technical solution may be used in networks of telecom operators and other networks with a large number of connected users (several tens of thousands or more).

The present detailed description is presented considering various non-restrictive and non-exhaustive options for implementation. At the same time, a person skilled in the art with the average level of competence in this technology field, would understand that various replacements, modifications or combinations of any disclosed implementation options (including partially) may be implemented within the scope of the present technical solution.

Additional variations and non-limiting embodiments of the present technology may be obtained by, for example, combining, modifying, or transforming any actions, components, elements, properties, aspects, characteristics, restrictions, etc., related to those listed here and not restrictive implementations. Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for transmitting multicast packet data, for a software-defined data communication network (SDN) having:

at least one input port configured to receive at least one data packet from a multicast group of packet data provided by at least one external traffic source;

at least two output ports configured to transmit the at least one data packet of the multicast group and to receive requests from at least one external traffic consumer; and at least one network node configured to transmit the at least one data packet of the multicast group according to configured switching rules;

at least one SDN controller configured to generate switching rules and configure the switching rules on the at least one network node;

the method comprising:

receiving, via the at least two output ports, a request from the at least one external traffic consumer to receive the at least one data packet of the multicast group;

receiving, via the at least one input port, the at least one data packet of the multicast group from the external traffic source; and generating, by the at least one SDN controller the switching rules and configuring the switching rules on the at least one network node for transmitting the at least one data packet, the generating of the switching rules being executed such that:

for a given one of the at least one external traffic consumer, the given one of the at least one external traffic consumer being the first to request the at least one packet data of the multicast group, determining a shortest path from (i) a given one of the at least one input port associated with the given one of the at least one external traffic consumer to (ii) a given one of the at least two output ports associated with the given one of the at least one external traffic consumer;

for a subsequent external traffic consumer, requesting the at least one packet data of the multicast group, determining a shortest path from a network node closest to a given one of the at least two output ports associated with the subsequent external traffic consumer where the switching rules for the at least one multicast group are set; and causing the at least one packet of the multicast group to be transmitted from the at least one input port to at least one of the at least two output ports according to the switching rules, wherein the determining of the shortest path includes applying a search algorithm that calculates path lengths based on a topology of the SDN.

2. The method of claim 1, further comprising:

configuring a given one of the at least one input port, by generating a range of group addresses, the group addresses generated by the at least one external source and received by the at least one input port.

3. The method of claim 1, wherein the request to receive the at least one data packet of the multicast group from the at least one external traffic consumer is sent asynchronously.

4. The method of claim 1, wherein the at least one data packet of the multicast group from the external traffic source is received at the at least one input port, asynchronously.

5. The method of claim 1, further comprising, during the causing of the at least one data packet of the multicast group to be transmitted:

applying a multicast communications protocol's finite state machine algorithm.

6. The method of claim 1, wherein the search algorithm that calculates path lengths based on a topology of the software defined network includes one of: Dijkstra's, Bellman-Ford algorithm, and A* search algorithms.

7. The method of claim 1, wherein the calculating of the path lengths includes accounting for initial, terminal, and intermediate network switches.

8. The method of claim 1, wherein the determining of the shortest path further comprises defining at least one switch of the shortest path and for each one of the at least one switch:

one input port is configured to receive traffic from the source side and one output group port, comprising one or more physical ports, is configured to allow traffic replication from the input port to each physical port being part of the output group port.

* * * * *